United States Patent [19]

Hemmady et al.

[11] Patent Number: 5,434,853
[45] Date of Patent: Jul. 18, 1995

[54] SYSTEM AND METHOD FOR PROVIDING SOFT HANDOFF OF A CELLULAR MOBILE-TO-MOBILE CALL

[75] Inventors: Jayant G. Hemmady, Naperville; Ronald A. Spanke, Wheaton, both of Ill.

[73] Assignee: AT&T Corp., Murray Hill, N.J.

[21] Appl. No.: 174,481

[22] Filed: Dec. 27, 1993

[51] Int. Cl.⁶ .................................................. H04L 12/56
[52] U.S. Cl. ......................................... 370/60; 370/95.1
[58] Field of Search ................. 370/60, 94.1, 95.2, 370/94.3, 95.1, 95.3, 85.13, 110.1; 379/91, 93, 94, 58, 59, 60; 455/33.1, 33.2, 33.3, 33.4; 340/825.02

[56] References Cited

U.S. PATENT DOCUMENTS

| | | | |
|---|---|---|---|
| 4,777,646 | 10/1988 | Harris | 379/91 |
| 4,887,265 | 12/1989 | Felix | 370/94.1 |
| 4,905,231 | 2/1990 | Leung et al. | 370/94.1 |
| 4,975,906 | 12/1990 | Takiyasu et al. | 370/85.13 |
| 5,136,584 | 8/1992 | Hedlund | 370/94.1 |
| 5,144,622 | 9/1992 | Takiyasu et al. | 370/85.13 |
| 5,168,498 | 12/1992 | Adams et al. | 370/95.1 |
| 5,184,347 | 2/1993 | Farwell et al. | 370/94.1 |
| 5,195,090 | 3/1993 | Bolliger et al. | 370/60 |

*Primary Examiner*—Douglas W. Olms
*Assistant Examiner*—Dang Ton
*Attorney, Agent, or Firm*—Michael B. Johannesen

[57] ABSTRACT

Soft handoff is provided in a mobile-to-mobile call in a cellular communication system, wherein a first mobile is moving from a first cell to a second cell, and the second mobile is in a third cell. The first mobile requests a handoff from the first cell to the second cell. In response, information regarding the call handoff is sent to the second and third cells. During handoff, the first and second cells receive radio transmission from the first mobile, and they both translate the transmissions into electronic data, packetize the data, and send the packetized data to the third cell. The third cell sends packetized data from the second mobile to both the first and second cells. Further, the second mobile may also move from the third cell to a fourth cell. The second mobile requests a handoff from the third cell to the fourth cell. Call data is sent to the fourth cell identifying the first and second cells. Call data is sent to the first and second cells identifying the fourth cell. The first and second cells thereafter transmit packetized data to the third and fourth cells, and the third and fourth cells send packetized data to the first and second cells.

8 Claims, 5 Drawing Sheets

SYSTEM AND METHOD FOR PROVIDING SOFT HANDOFF OF A CELLULAR MOBILE-TO-MOBILE CALL

CROSS-REFERENCE TO RELATED APPLICATION

This application is related to U.S. patent application Ser. No. 08/174,482 entitled "System for Communicating Digital Cellular Data Between a Cell Site and a Switching System or Another Cell Site," filed concurrently with this application.

TECHNICAL FIELD

This invention relates to the field of packet switching, and more specifically, to providing a soft handoff between two mobiles in a connectionless code division, multiple access cellular system.

BACKGROUND OF THE INVENTION

Code division, multiple access (CDMA) cellular communications provides 10–20 times the call handling capacity of analog cellular communications systems. See, e.g., "An Overview Of The Application Of Code Division Multiple Access (CDMA) To Digital Cellular Systems And Personal Cellular Networks," May 21, 1992, available from Qualcomm, Inc.—10555 Sorrento Valley Road—San Diego, Calif. A CDMA system transmits/receives voice or data at the relatively slow rate of approximately 8 Kbps to/from a mobile unit over a spread spectrum signal. (Other rates may be supported e.g. 16 Kbps, but the rate is still below the connection-based telephone industry standard rate of 64 Kbps). A transceiver at the cell site sends/receives the spread spectrum signal and translates it from/into CDMA data packets. A speech handler translates the data packets into and out of digital 64 Kbps pulse code modulated (PCM) stream, as used in standard connection-based digital switching. (CDMA cellular communications is more fully described in Qualcomm, Inc., "The Wideband Spread Spectrum Digital Cellular System Dual Mode Mobile Station-Based Station Compatibility Standard," and Qualcomm, Inc., "CDMA Digital Common Error Interface Standard," revision 1.0, October, 1993). In most CDMA system designs, the speech handler is at the cell site. A 64 Kbps circuit-switched connection is then made for transmitting and receiving CDMA data packets between the cell site through the serving switch and the public switch telephone network (PSTN).

A problem associated with this system is that, as the mobile moves from cell to cell, the circuit connection between the cell site and the switch must be torn down and re-established to the new cell site. Tearing down and re-establishing a circuit connection as a mobile moves from cell to cell and from switch to switch is known in the art as a "hard handoff." Hard handoffs are perceivable by the user as noticeable clicks and/or pauses in service. It is desirable in the art to provide "soft handoffs," or handoffs from cell to cell and from switch to switch that are not perceptible to the user.

One solution to the problem of hard handoff in CDMA systems is found in U.S. Pat. No. 5,184,347, which issued to AT&T in the name of Farwell, et al. (herein "Farwell"). Farwell provides a system that delivers CDMA packets from a cell site to a speech handler. Each cell site is connected to a cell-interconnect module which consists of a DS1 interface unit, a local area network bus, and a packet processing network. The content (voice or data) of the spread spectrum radio signal from the mobile unit is first packetized at the cell site. Packets are then addressed for the packet processing network and transmitted from the cell site over a DS1 link to the DS1 interface unit. This DS1 interface unit delivers the packets to the local area network bus, which is connected to a packet processing element. The packet processing element includes a table for translating a packet processing element address into a speech handler address. The packet is then sent to a optic fiber interface and over the optic fiber to an expansion interface. The expansion interface places the packet on another local area network. The packet is then picked up by a speech processing unit from the local area network.

Soft handoffs are initiated in the system of the Farwell patent by the mobile determining that it is in range of a second cell site. A handoff request message is sent from the mobile to the mobile switching complex, designating the second cell site as the new cell site. A new path is then set up through the switch complex to the speech handler by first selecting a route from the new cell site to the existing speech handler, and then informing each element along the route of the new connection. Each element then populates its lookup table with the appropriate call data to route the call to the next element, and eventually to the speech handler. The speech handler then receives two packets containing nearly identical data, and selects the one with a stronger signal strength (included as part of the data in the packet). Thus, the same speech handler is used for both cells, and a hard handoff is avoided. This system is complex in hardware and requires some time to establish and tear down each path through the system, because of the time necessary to populate all of the look-up tables.

A second solution to the problem of hard handoffs is found in U.S. patent application Ser. No. 08/040,819, filed Mar. 31, 1993, in the name of Hemmady, et al. (herein "Hemmady"). Hemmady provides a system for relaying packets between a cell site transceiver and a destination PSTN interface, via a self-routing, packet-switched mechanism. Packets from the cell site include a unique routing address of the destination PSTN interface (speech handler) which is located in a switching office. The packets are constructed by the receiver at the cell site including the content of the spread spectrum radio signal and sent in a packet pipe to a packet switch in a host switching system. A packet handler at the packet switch receives the packets, demultiplexes the packet pipe and forwards the packets on a packet bus. The destination PSTN interface assigned to that call recognizes its own address in the packets on the packet bus and processes the packets. As the mobile moves from cell to cell, and from a cell connected to one switch to a new cell connected to another switch, the new cell site is informed of the address of the destination PSTN interface originally assigned to the call, and the new cell uses its own packet pipes to its mobile telephone switch office (MTSO) and then to the destination PSTN interface, using the same address. The destination PSTN interface, during the period when a mobile is moving from one cell to another, receives packets from both cell sites and selects the best quality packet. This system does not require the circuit switched connections or updating tables, etc., of the Farwell disclosure. This system, however, requires expensive hardware for handling packets at each switch through which packets are sent.

Neither of these two systems address the problems associated with calls from a first CDMA mobile system to a second CDMA mobile system or provides soft handoff between multiple mobile systems. As stated above, CDMA digital packets are broadcast at a rate of 8 Kbps. When these packets arrive at a switch, they are translated by the speech handler into a 64 Kbps rate so that they may be handled by the switch. For a mobile-to-mobile call, the 64 Kbps packets must again be turned into 8 Kbps packets in order to be broadcast on the CDMA system. Every translation from one format to another degrades the quality of the encoded voice or other signals in the packet.

Therefore, a problem in the art is that there is no system which can provide soft handoff for a mobile to mobile call without degrading the quality of the call.

SUMMARY OF THE INVENTION

This problem is solved and a technical advance is achieved in the art by a system and method for providing soft handoff for a mobile-to-mobile call in a cellular communication system, wherein a first mobile is moving from a first cell to a second cell, and the second mobile is in a third cell. The cellular communication system includes a database containing information regarding all calls in the system. The first mobile requests a handoff from the first cell to the second cell. In response, the database sends call data regarding the call to the second and third cells. Thereafter, the first and second cells receive radio transmission from the first mobile, they both translate the transmissions into electronic data, packetize the data, and send the packetized data to the third cell. The third cell, upon receiving a new destination information from the database, begins sending packetized data from the second mobile to the first and second cells.

Further, the second mobile may also move from the third cell to a fourth cell. The second mobile requests a handoff from the third cell to the fourth cell. The database delivers call data to the fourth cell wherein the call data comprises the identifications the first and second cells. The database also delivers call data to the first and second cells wherein the call data comprises the identification of the third and fourth cells. The first and second cells thereafter transmit packetized data to the third and fourth cells, and the third and fourth cells send packetized data to the first and second cells. Advantageously, a signal strength indication is encoded in the packetized data. Once the signal strength indication for a particular cell falls below a predetermined threshold, the database is notified and that cell is deleted from the call data kept by the cells.

BRIEF DESCRIPTION OF THE DRAWING

A more complete understanding of the invention may be obtained from consideration of the following description in conjunction with the drawings in which.

DETAILED DESCRIPTION

Figure 1:
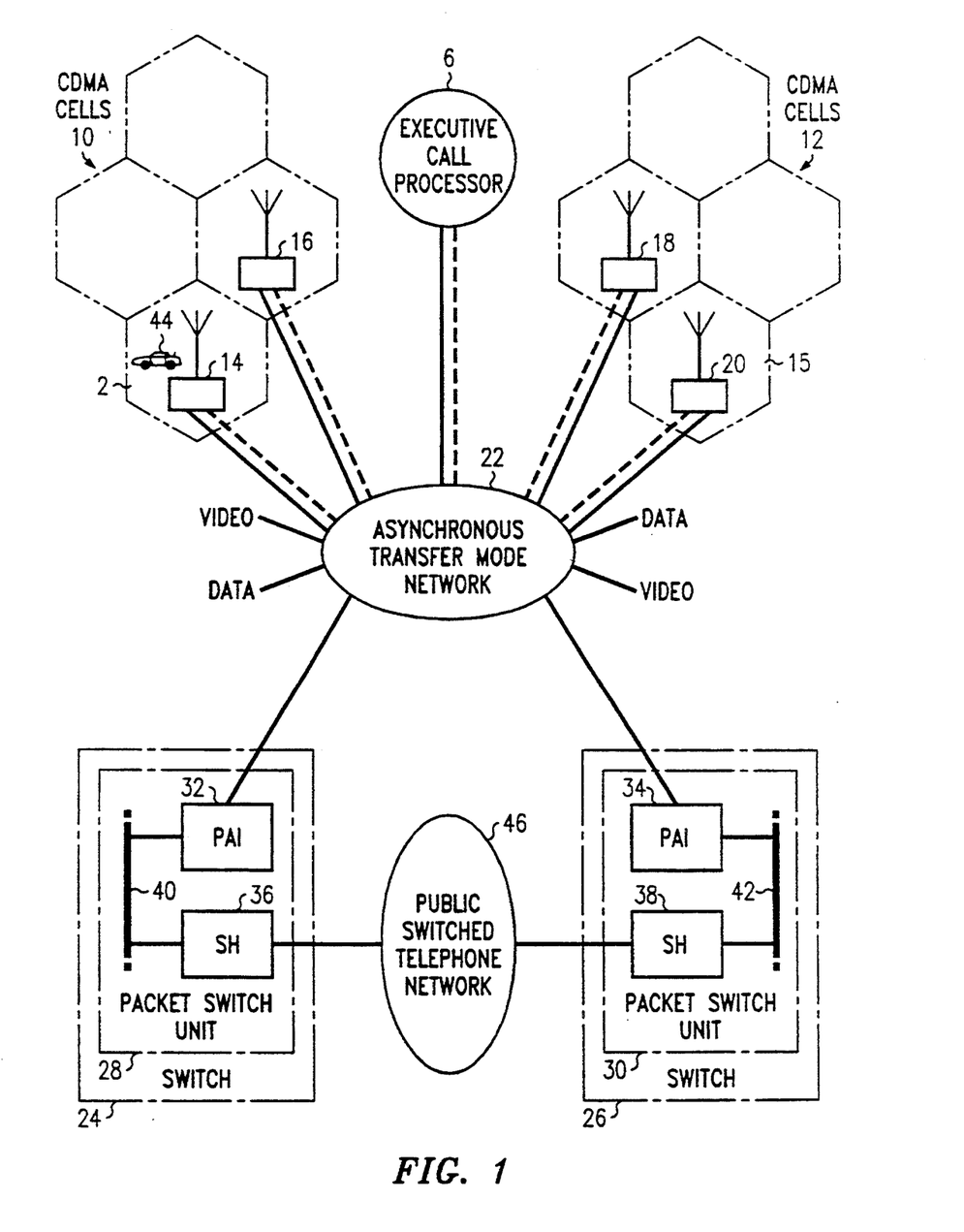
FIG. 1 is a block diagram of a plurality of mobile telephone switching systems, a public switch telephone network, and a packet switch (at a telephone switching office) wherein the packet switch distributes CDMA packets to speech handlers or to other cell sites according to an exemplary embodiment of this invention.

An exemplary embodiment of a system for providing soft handoffs for mobile-to-mobile calls is described herein, in the context of a mobile telephone switching system and a public-switched telephone network as illustrated in FIG. 1. FIG. 1 illustratively includes two CDMA cellular regions 10 and 12. These CDMA regions are illustrated as being separate, but may in fact be parts of one larger CDMA cellular system. Each CDMA cell includes a cell site, for example cell sites 14–20. Cell sites 14–20 send and receive CDMA radio signals over the spread spectrum, as described above, to and from mobile telephones within their individual cells, and packetize the communication content of the radio signals into electronic data, which is then packetized. Each cell site 14–20 is in communication with executive call processor (ECP) 6 via data links (shown as dashed lines). ECP 6 keeps track of calls in its associated cellular system as is known in the art and described in *The Bell System Technical Journal*, Vol. 58, No. 1, January, 1979. ECP 6 is shown connected to ATM network, but may also be connected to a separate ECP network.

Cell sites 14–20 are connected to an asynchronous transfer mode (ATM) network 22. ATM network 22 is an example of a fast packet network according to this invention. As will be described below in connection with FIG. 3, cell sites 14–20 include an ATM interface which repacketize the CDMA data packets and send them to their destination over ATM network 22. ATM network 22 is connected to a plurality of sources and destinations of packet traffic including video and data, as well as CDMA traffic from cells 14–20, according to this invention.

ATM network 22 is also connected to a plurality of telephone switching offices represented by switches 24 and 26. Switches 24 and 26 may serve both cellular and wire line traffic, as will be described below in connection with FIG. 2. Switches 24 and 26 are connected to public switched telephone network 46 as well as to ATM network 22 via packet switch units 28 and 30, respectively.

Packet switch units (PSU) 28 and 30 according to an exemplary embodiment of this invention include packet access interface (PAI) units 32 and 34 and speech handlers 36 and 38, respectively. PAIs 32 and 34 and speech handlers 36 and 38 are connected to respective packet buses 40 and 42. Speech handlers are known in the art as "end points." Other end points performing similar (or dissimilar) functions may also be connected to the packet bus, but are not shown for clarity. A packet bus and its attached endpoints are called a "packet community." PAI 32 sends and receives ATM packets to and from ATM network 22 for data communicated by switch 24 through ATM network 22.

According to an exemplary embodiment of this invention, mobile telephone 44 initiates a call in cell 2 to a land-based telephone in PSTN 46. In this exemplary embodiment, there are one or more speech handlers connected to packet bus 40 in packet switch unit 28. A CDMA call is set up between mobile 44 and cell site 14. Speech handler 36 (in this example at switch 24, which is closest to the final PSTN destination) is assigned to the call and a unique two-part address is given to the cell site 14 that describes speech handler 36, as will be described below in connection with FIG. 3.

As CDMA signals arrive at cell site 14 (or other cell sites, such as 16) they are packetized and the two-part address of the speech handler is added to it. The packets are then encapsulated (repacketized) with transport protocol data for transmission on ATM network 22. ATM network 22 reads the packet address and delivers the packet to the appropriate packet access interface, PA1 32 in this example. PA1 32 receives the packet from ATM network 22 and removes the packet data from the ATM payload. The packet data is then placed on bus 40. Speech handler 36 monitors bus 40 and sees that the packet is for it. Speech handler 36 then takes the packet off bus 40, translates the data into 64 Kbps PCM and transmits it into public-switched telephone network 46 to a land-based destination.

Figure 2:
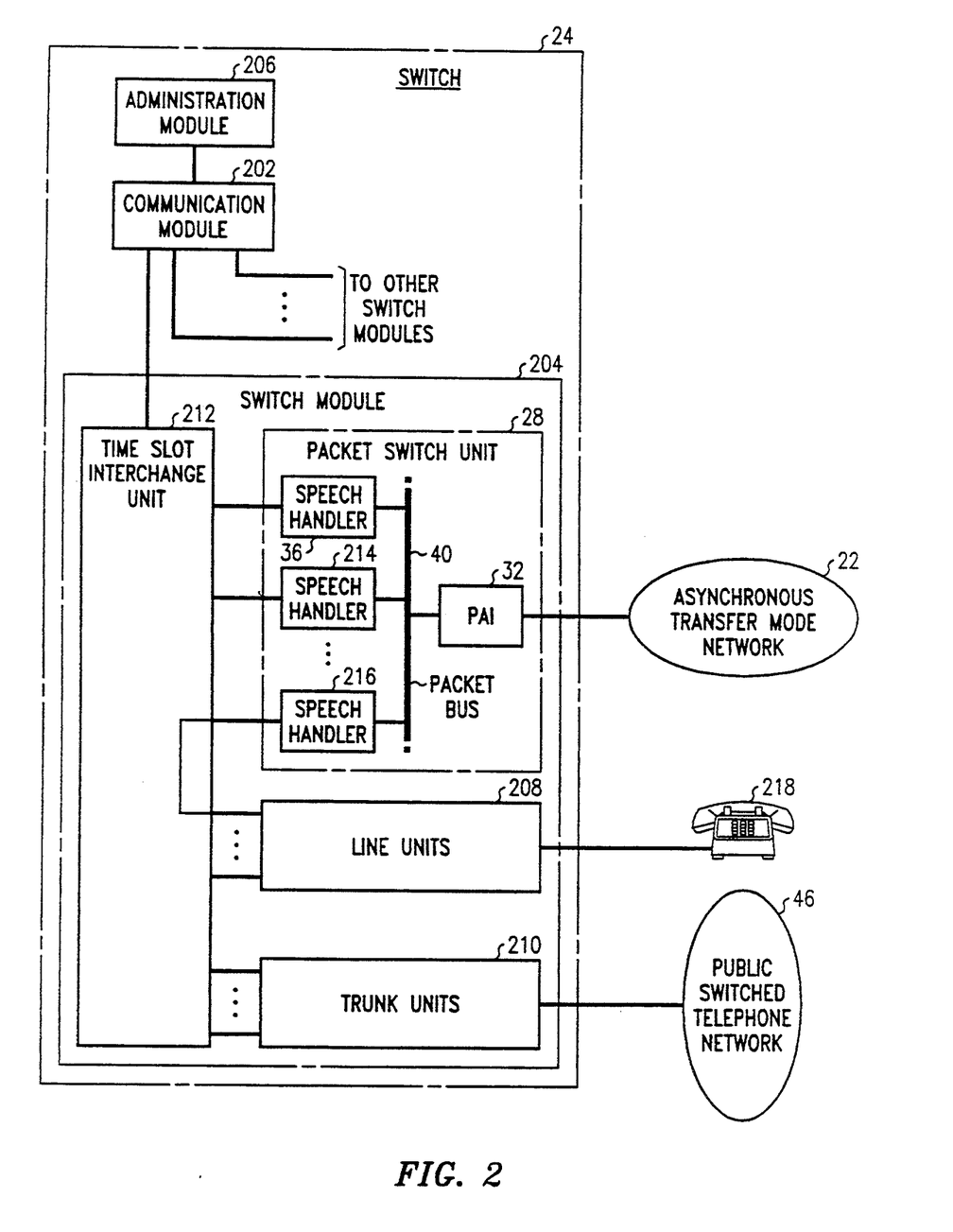
FIG. 2 is a block diagram of a telephone switching office that acts as a destination point according to an exemplary embodiment of this invention.

Turning to FIG. 2, switch 24 is shown in more detail. Illustratively, switch 24 is a distributed control, ISDN telephone system such as the system disclosed in U.S. Pat. No. 4,592,048, issued to M. W. Beckner et al. on May 27, 1986. Alternatively, switch 24 may be a distributed control digital switch such as a 5ESS ® switch manufactured by AT&T and described in the *AT&T Technical Journal*, Vol. 64, No. 6, July/August 1985, pages 1303–1564. The architecture of each of the switch 24 includes communication module 202 as a hub, a switch module 204, other switch modules (not shown for clarity), and an administrative module 206 emanating therefrom. Switch module 204 terminates analog and/or digital subscriber lines through line units 208 and analog or digital trunk through trunk units 210. Trunk unit 210 provides communication with public-switched telephone network 46. Administrative module 206 provides coordination of functional components of switch and human machine interface. Switch module 204 includes a time-slot interchange unit (TSIU) 212 and packet switch unit 28. TSIU 212 provides interchange of 64 Kbps PCM for 64 Kbps clear channel among the units in switch module 204. Switch module 204 may also contain other units, but for purposes of clarity, these other units are not shown.

To continue the example of FIG. 1, packets arrive from an ATM network 22 at PAI 32 where they are removed from the payload of the ATM cell. Packets are then reassembled (if necessary) into the full CDMA packet length and sent on packet bus 40. Speech handler 36 then recognizes the two part address that is addressed to itself and removes the packet from packet bus 40. Speech handler 36 processes the CDMA data packet into 64 Kbps PCM and sends the data to time slot interchange unit 212.

Packet switch unit 28 supports a number of speech handlers, including speech handlers 36, 214 and 216, for example, simultaneously. Speech handler 216 is shown having a connection through TSIU 212 to line unit 208 and to telephone 218. Any connection from the speech handlers can be made through TSIU 212 to line units such as 208 and to trunk unit 210.

Returning briefly to FIG. 1, soft handoffs may easily be achieved through use of this system. To continue the example from above, mobile 44 is connected via cell site 14 through ATM 22 to PAI 32 which then places packet data onto packet bus 40 through speech handler 36 into a telephone connected to public switch telephone network 46.

As mobile 44 moves into cell 4 which is served by cell site 16 it senses a pilot signal, as is known in the art, and requests a handoff. Executive call processor (ECP) 6 is notified and ECP 6 sends data regarding the call to cell site 16. Alternatively, cell site 14 can communicate directly with new handoff cell site 16, and sends data regarding the call to cell site 16. This cell site to cell site communication also utilizes ATM network 22. The call data includes the destination address of PA1 32 and speech handler 36 so that cell site 16 may repacketize data and send the packetized data through ATM network 22 to PA1 32, and ultimately to speech handler 36. ECP also informs speech handler 36 that it is to transmit data to both cell sites 14 and 16. Alternatively, speech handler 36 receives a "join" message directly from cell site 16 to add or "join" the new cell site to the destination list, at which point it begins to transmit data to both cell sites 14 and 16. At this point, cell sites 14 and 16 will both receive spread spectrum signal from mobile 44, packetize the data from the signal, repacketize the data into ATM cells and send such ATM cells on ATM network 22. PAI 32 will receive both packets containing identical (or nearly identical) data, remove the packets from the ATM cells and send reassembled CDMA packets on bus 40. Speech handler 36 then receives both packets and, through use of a signal strength indication encoded in the CDMA packets, decides which packet to process and send to PSTN 46.

Information coming from PSTN 46 arriving at speech handler 36 is packetized into CDMA packets, replicated and addressed for both cell site 14 and 16. These packets are put on bus 40 received by PA1 32 repacketized into ATM cells and sent through ATM network 22 to cell sites 14 and 16. Cell sites 14 and 16 depacketize the CDMA packet data, translate the CDMA packet data into a spread spectrum signal and broadcast the data to mobile 44. Mobile 44 determines which packet contains a stronger signal strength indication and depacketizes that packet. Eventually, as mobile 44 moves into cell 4, the signal strength of cell site 14 will fall below a threshold. ECP 6 is notified, and ECP removes the destination 14 from speech handler 36 list and removes the call data from cell site 14. Alternatively, when the signal strength falls below a threshold, cell site 14 removes the call data and also sends a disconnect message to speech handler 36, informing it to also remove destination 14. Through this system, a soft handoff may be achieved without tearing down and setting up a new connection through MTSO 28 or transferring a call from one switch to another. Thus, no user perceptible clicks or discontinuities are present.

Further, mobile 44 may be traveling across the country. Cell 2 may be, for example, in New Jersey and cell 15 may be, for example, in Illinois. Generally, fewer switching resources are used if the speech handler processing the call is closest to the destination of the call. For example, speech handler 36 at PSU 28 may be a portion of the same telephone office of the destination telephone. As mobile 44 moves from cellular system 10 to cellular system 12, for example, moving into cell 15 with cell site 20, mobile 44 receives the pilot signal and initiate a call handoff as described above. Cell site 20 receives the destination packet information from ECP 6 or from the existing cell site 2. Cell site 20 then begins delivering repacketized data to ATM 22 which can transport packets across an urban area or across the country. These packets are then delivered to PAI 32, translated at speech handler 36, and delivered to the destination telephone in PSTN 46 as described above. Thus, this exemplary embodiment of this invention may be used for a "long-haul" cellular switching network to achieve reduced "long-haul" transportation costs.

Figure 3:
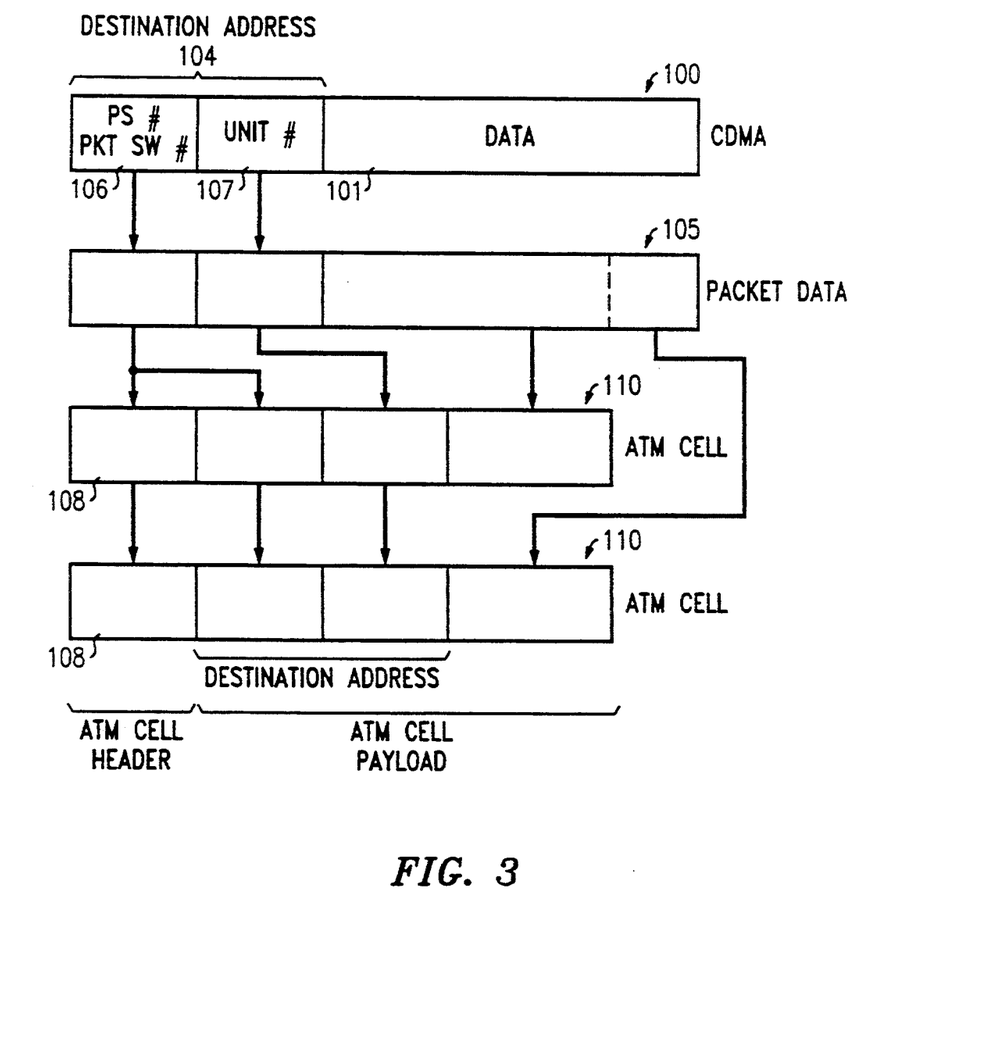
FIG. 3 is a block diagram of a packet addressing system according to one aspect of this invention.

FIG. 3 is a block diagram of a packet addressing system according to an exemplary embodiment of this invention as applied to the embodiment of FIGS. 1 and 2. Packet 100 comprises an electronic data packet as it is generated at the CDMA cell site. Packet 100 includes a destination address 104 and a data portion 101 for the CDMA packet including information. Destination address 104 comprises two fields, a destination packet switch number 106, also called packet community, and a unit number 107 designating an end-point within the packet community. This address is assigned during call set up and propagated throughout the cellular system as mobile 44 (FIG. 1) moves from cell to cell, as described above.

In the embodiment of FIG. 1, cell site 14 adds whatever protocol is required by the packet community, if any, transforming CDMA data packet 100 into packet data 105 (FIG. 3). In this example, packet switch number field 106 is the number of packet switch community 24; unit number field 107 is for the end point speech handler 36.

Cell site 14 then encapsulates packet 105 into one or more ATM cells 110. This may include breaking the data into multiple parts according to the size of an ATM payload if the data portion 101 is too long for one ATM cell 110, as in this example. Cell site 14 then places the community address field into the ATM cell header 108 of ATM cell 110.

After cell site 14 delivers ATM cells 110 to ATM network 22, ATM network delivers ATM cell to PA1 32; PA1 32, removes the ATM transport layer to reassemble the data into packets 105 and send it on bus 40. Speech handler 36 recognizes its destination end point number and its packet community number and receives packet 105. In this manner, packetized data may be sent throughout a connectionless transport system without delaying the initial packets. Furthermore, routing information does not have to be stored in every node handling the packet.

Figure 4:
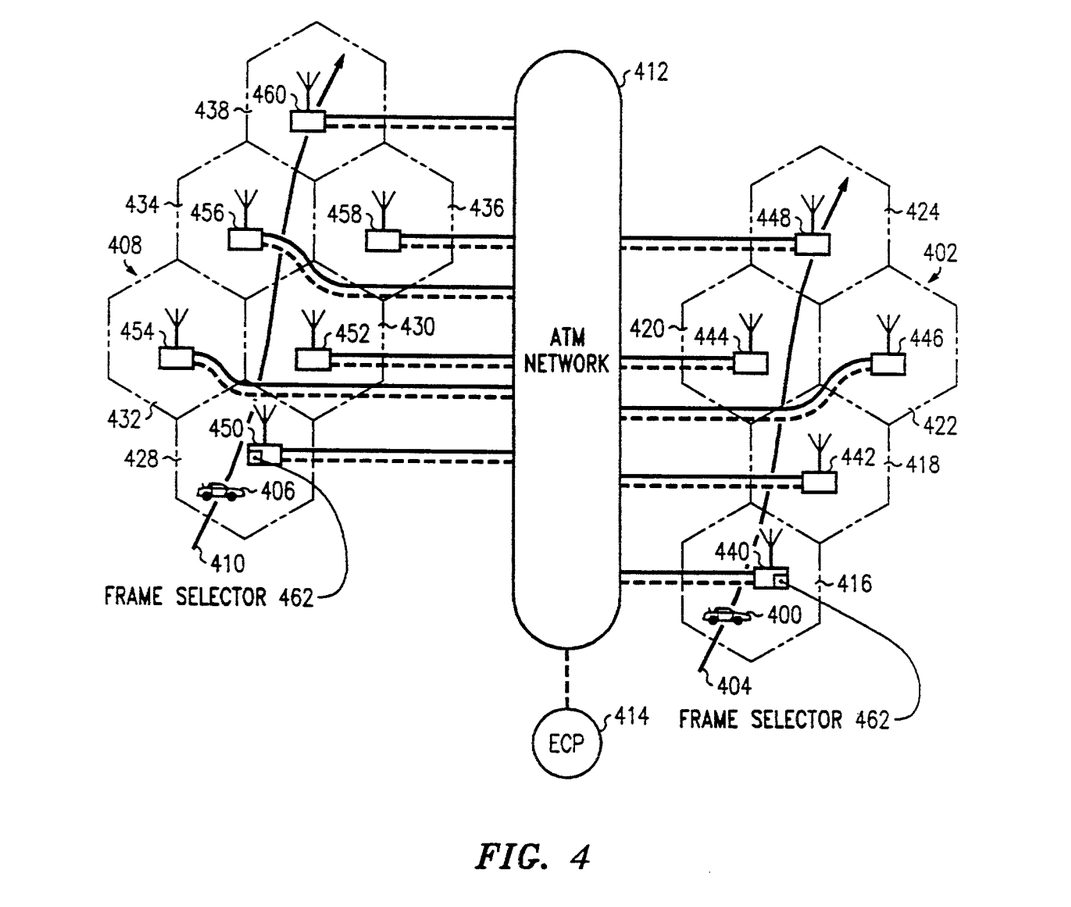
FIG. 4 is an illustration of a mobile-to-mobile call according to an exemplary embodiment of this invention.

Turning now to FIG. 4, an exemplary embodiment of a mobile-to-mobile call according to this invention is described. FIG. 4 shows a mobile telephone 400 traversing a first cellular system 402 via path 404. In this example, mobile 400 places a call to mobile 406 which is traversing a second cellular system 408 via path 410. All of the cells in both cellular systems 402 and 408 are connected to ATM network 412. ATM network 412 is also connected to executive call processor (ECP) network 414 via the dashed lines. ECP network 414 keeps track of all calls in its associated cellular systems 402 and 408, as known in the art and described in Bell System Technical Journal, Vol. 58, No. 1, January, 1979, and knows the ATM destination address of each cell site. Cellular system 402 comprises a plurality of cells 416–424 and cellular system 408 comprises cells 428–438. Within each cell 416–424 and 428–438 is a cell site 440–448 and 450–460 respectively, which process calls as is known in the art. In each cell site is a frame selector 462 which, as will be described more fully below, keeps track of the calls for mobiles located within radio range of that cell site.

As mobile 400 traverses cellular system 402 via path 404, it initiates a mobile-to-mobile call to mobile 406, starting in cell 416. Cell site 440 in cell 416 reports the call origination to ECP 414, which stores the data, recognizes that the call is to another mobile, and locates mobile 406 in cell 428. Data regarding the call is sent to cell sites 440 and 450, and stored in frame selectors 462 associated with the respective cell sites (in this example 440 and 450). The data includes the ATM destination address of the other cell site connected with the call. As signals arrive at cell site 440 from mobile 400 they are packetized and the unique two-part address of cell site 450 is added, as described above in connection with FIG. 3. The packets are then repacketized, put into the payload of an ATM cell, the ATM address of cell site 460 is added and the packet is sent through ATM network 412 to cell site 460. At cell site 460, the packets are removed from the ATM cell, translated into the CDMA spread spectrum signal and broadcast to mobile 406. Likewise, CDMA signals from mobile 406 are received via the spread spectrum at cell site 450, the contents of which are translated into electronic data, placed into ATM cells which are given the ATM address of cell site 440 and sent via ATM network 412 to cell site 440 where they are formatted and translated into the CDMA spread spectrum signal and broadcast to mobile 400. In this manner, the subrate 8 KHz signal of CDMA is not translated into the 64 KHz PCM and back into CDMA packets as described above in connection with switched calls, thereby avoiding multiple translations into and out of different formats, and thus preserving signal quality while using fewer network resources.

A soft handoff of mobile 400 as it moves from cell 416 to cell 418 will now be described. As mobile 400 traverses cellular system 402 along path 404, it eventually reaches the boundary between cell 416 and cell 418. As is known in the art (according to the CDMA reference cited above), mobile 400 senses a pilot signal given out by cell site 442 and monitors its signal strength. When the signal strength reaches a predetermined threshold, mobile 400 sends an identification message to cell site 442 and requests a handoff, which begins a handoff transition period. Cell site 442 receives the call information regarding mobile 406 from ECP 414, or alternatively from cell site 440. Such call information including the ATM address of the destination cell site for mobile 406, which is cell site 450. Cell site 442 then begins sending the content of the CDMA spread spectrum signal from mobile 400 to cell site 450.

Cell site 450 receives transmissions of ATM cells from both cell site 440 and cell site 442 at frame selector 462. Frame selector 462 then selects the cell with the strongest signal (signal strength having been previously encoded in the CDMA signal, as described in the references cited above), determines which signal is stronger and delivers that packet to the transmitter of cell site 428 for transmission to mobile 406. Upon receiving ATM destination information about new cell site 418 from ECP 414, frame selector 462 in cell site 450 updates its own destination list so that it sends signal data from mobile 406 to both cell site 440 and cell site 442. This dual destination situation remains throughout the soft handoff transition. Thereafter, when the signal strength from cell site 440 falls below a threshold, cell site 440 ceases sending ATM signals to cell site 450. Cell site 450 is informed by ECP 414 or, alternatively, cell site 440, to delete cell site 440 from its list of destinations, which ends the handoff transition period.

While a handoff is occurring for mobile 400 between cells 416 and 418, mobile 406 may likewise be approaching the boundary between cell 428 and cell 430. Mobile 406 senses a pilot signal given out by cell site 452 in cell 430 and, when the signal strength reaches a predetermined threshold, mobile 406 sends an identification message to cell site 452 and requests a handoff. Cell site 452 receives the call information regarding mobile 400 from ECP 414, or, alternatively from cell site 450, which includes the ATM address of both destination cell sites which, at this point, comprise cell sites 440 and 442. The tables of cell sites 440 and 442 are also updated to add the ATM address of mobile 406 in cell site 430 after receiving data from ECP 414 or a join message from the new cell site 452. Cell sites 440 and 428 now begin to send their packets to both cell sites 450 and 452. Finally, both cell sites 450 and 452 are sending packets to cell sites 440 and 442, and likewise, cells 440 and 442 are sending packets to cell sites 450 and 452.

Figure 5:
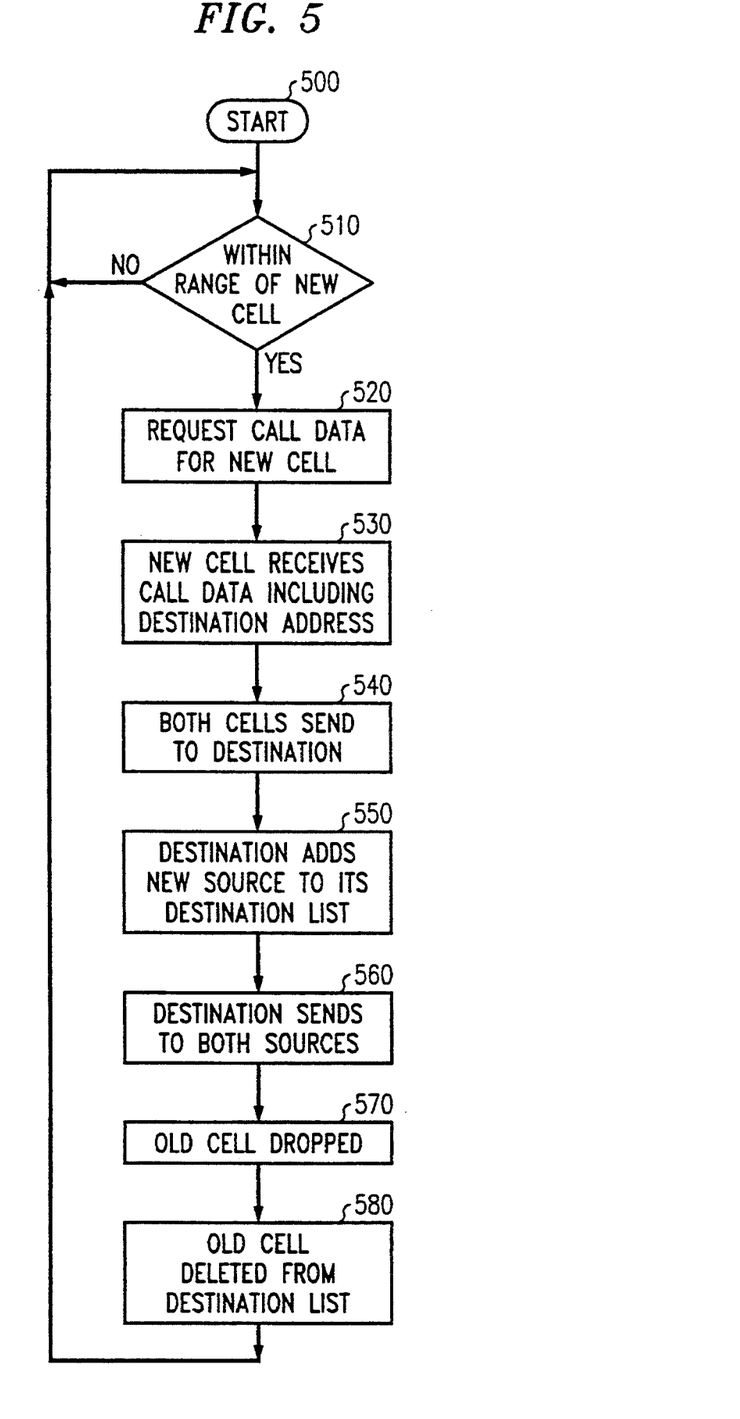
FIG. 5 is a flow chart describing the steps of a soft handoff for a mobile-to-mobile call according to an exemplary embodiment of this invention.

Turning now to FIG. 5, a flow chart describing the soft handoff scenario is shown. This flow chart starts in circle 500 after the call has initially been completely set up. In decision diamond 510, a determination is made whether the mobile is within the range of a new cell. If the mobile is not in range of a new cell, then processing returns back to decision diamond 510. If, in decision diamond 510, it is determined that the mobile is within the range of the new cell, then processing continues to box 520 where the ECP or first cell is notified. The ECP or first cell responds by sending the call data, including the ATM address, to the new cell site.

In box 530, the new cell receives the call data from the ECP or first cell, including the address of the destination, then., in box 540, both cells begin transmitting received CDMA spread spectrum signals to the destination cell (or cells if the destination mobile is also in a soft handoff transition). Processing continues to box 550 where the destination cell adds a new source address for the new cell to its destination list, responsive to receiving call data comprising the new cell's destination address from the ECP or from new cell site. Next, in box 560, destination sends signals it receives from its mobile to both sources. Eventually, the old cell is dropped at the source as shown in box 570 and the old cell is deleted from the destination list in box 580. Processing then returns to decision diamond 510 where checks are then made to determine if the mobile is within range of a new cell. In this manner, soft handoffs may be achieved without tearing down and setting up a circuit switch connection between cell sites (or MTSOs connected to the cell sites). Advantageously, no discernible discontinuities are present in the communications between mobile 400 and mobile 406.

It is to be understood that the above-described embodiment is merely an illustrative principle of the invention and that many variations may be devised by those skilled in the art without departing from the scope of the invention. It is, therefore, intended that such variations be included within the scope of the claims.

We claim:

1. A method, for use in a cellular communications system, for handing off a cellular call from a first cell to a second cell, wherein said cellular call was previously established between a first mobile in said first cell and a second mobile in a third cell, each of said cells having a respective cell site, said method comprising the steps of:

said first mobile, upon moving from said first cell to said second cell, requesting from the system a handoff from said first cell to said second cell;

said second cell site receiving call data regarding said call, said call data including an identification of said third cell site;

said third cell site receiving call data regarding said call, including an identification of said second cell site;

during a handoff transition period, said first and second cell sites sending data signals representative of signals received from said first mobile to said third cell site, and said third cell site sending data representative of signals received from said second mobile to said first and second cell sites.

2. A method according to claim 1 further including the step of:

said cellular communications system updating its call data for said call between said first and second mobiles to include said second cell site.

3. A method according to claim 1, wherein said second mobile is moving from said third cell into a fourth cell, said fourth cell having a fourth cell site, said method further including the steps of:

said second mobile requesting a handoff from said third cell to said fourth cell;

said fourth cell site receiving call data regarding said call between said first and second mobiles, said call data including an identification of said first and second cell sites responsive to said handoff request;

said first and second cell sites receiving call data regarding said call between said first and second mobiles, said call data including an identification of said fourth cell site;

during said handoff transition period, said third and fourth cell sites sending said data signals representative of signals received from said second mobile to said first and second cell sites, and said first and second cell sites sending said data signals representative of signals received from said first mobile to said third and fourth cell sites.

4. A method according to claim 1 further including the step of:

after said first mobile moves out of said first cell, deleting said first cell from said call data in said third cell site.

5. A method according to claim 3 further including the step of:

after said first mobile moves out of said first cell, deleting said first cell from said call data in said third cell site, and said fourth cell site.

6. A method for use in a cellular communications system for handing off a cellular call from a first cell to a second cell, wherein said cellular call was previously established between a first movile in said first cell and a second mobile in a third cell, each of said cells including a cell site, wherein all cell sites in said cellular system are connected to a high speed packet network, said cell sites embedding electronic data representative of radio signals received from said mobiles into packets transmissible by said high speed packet network, each of said cell sites having a unique address in said high speed packet network, said method comprising the steps of:

said first mobile, upon moving from said first cell to said second cell, requesting from said system a handoff from said first cell to said second cell;

said second cell site receiving call data including said unique address of said third cell site;

said third cell site receiving said call data including said unique address of said second cell site; and during a handoff transition period, said first and second cell sites sending said packets containing said electronic data from said first mobile to said third cell site via said fast packet network and said third cell site sending said packets containing said electronic data from said second mobile to said first and second cell sites via said fast packet network.

7. A method according to claim 6 wherein said packets include a signal strength indication of said radio signals from said first mobile, said method further including:

ending said handoff transition period when said signal strength indication in said packets falls below a predetermined threshold by said third cell site deleting said address of said first cell site.

8. A method according to claim 6, wherein said second mobile is moving from said third cell to a fourth cell, said fourth cell having a fourth cell site, said method further including the steps of:

said second mobile requesting a handoff from said third cell to said fourth cell;

said fourth cell site receiving call data comprising said unique address of said first and second cell sites, and said first and second cell sites receiving said unique address of said fourth cell site;

during a handoff transition period, said first and second cell sites sending said packets containing said electronic data from said first mobile to said third and fourth cell sites via said fast packet network; and during said handoff transition period, said third and fourth cell sites sending said packets containing said data signals from said second mobile to said first and second cell sites.

* * * * *

UNITED STATES PATENT AND TRADEMARK OFFICE
CERTIFICATE OF CORRECTION

PATENT NO. : 5,434,853
DATED : July 18, 1995
INVENTOR(S) : J. G. Hemmady, R. A. Spanke It is certified that error appears in the above-identified patent and that said Letters Patent is hereby corrected as shown below:

Column 10, line 55, "movile" should be --mobile--.

Signed and Sealed this

Twenty-fourth Day of October, 1995

Attest:

BRUCE LEHMAN

Attesting Officer     Commissioner of Patents and Trademarks